(12) United States Patent
Locker et al.

(10) Patent No.: US 8,296,385 B2
(45) Date of Patent: Oct. 23, 2012

(54) APPARATUS AND METHOD FOR SELECTIVE ENGAGEMENT IN SOFTWARE DISTRIBUTION

(75) Inventors: Howard J. Locker, Cary, NC (US); Richard W. Cheston, Morrisville, NC (US); Daryl C. Cromer, Cary, NC (US); Robert S. Gamble, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1045 days.

(21) Appl. No.: 11/788,845

(22) Filed: Apr. 23, 2007

(65) Prior Publication Data

US 2008/0263136 A1 Oct. 23, 2008

(51) Int. Cl.
*G06F 15/16* (2006.01)
*G06F 15/167* (2006.01)

(52) U.S. Cl. .................. 709/211; 709/214; 709/205

(58) Field of Classification Search .......... 709/220, 709/211, 214, 205
See application file for complete search history.

(56) References Cited

U.S. PATENT DOCUMENTS

| | | | | |
|---|---|---|---|---|
| 5,014,267 A * | 5/1991 | Tompkins et al. | ........... | 370/259 |
| 5,859,641 A | 1/1999 | Cave | ........... | 345/348 |
| 6,134,584 A | 10/2000 | Chang et al. | ........... | 709/219 |
| 6,167,567 A | 12/2000 | Chiles et al. | ........... | 717/11 |
| 7,415,537 B1 * | 8/2008 | Maes | ........... | 709/246 |
| 2002/0138576 A1 | 9/2002 | Schleicher et al. | ........... | 709/205 |
| 2002/0161913 A1 | 10/2002 | Gonzalez et al. | ........... | 709/233 |
| 2003/0018712 A1 * | 1/2003 | Harrow et al. | ........... | 709/203 |
| 2003/0069968 A1 | 4/2003 | O'Neil et al. | ........... | 709/225 |
| 2003/0074403 A1 * | 4/2003 | Harrow et al. | ........... | 709/203 |
| 2003/0093476 A1 | 5/2003 | Syed | ........... | 709/204 |
| 2003/0097370 A1 * | 5/2003 | Yamamoto | ........... | 707/104.1 |
| 2003/0177183 A1 | 9/2003 | Cabrera et al. | ........... | 709/204 |
| 2003/0212992 A1 | 11/2003 | Ronning et al. | ........... | 717/178 |
| 2003/0217158 A1 * | 11/2003 | Datta | ........... | 709/228 |
| 2003/0233455 A1 | 12/2003 | Leber et al. | ........... | 709/226 |
| 2004/0172476 A1 | 9/2004 | Chapweske | ........... | 709/231 |
| 2004/0236869 A1 | 11/2004 | Moon | ........... | 709/246 |
| 2005/0138176 A1 * | 6/2005 | Singh et al. | ........... | 709/226 |
| 2005/0188251 A1 * | 8/2005 | Benhase et al. | ........... | 714/6 |
| 2005/0216421 A1 * | 9/2005 | Barry et al. | ........... | 705/64 |
| 2006/0101400 A1 * | 5/2006 | Capek et al. | ........... | 717/120 |
| 2007/0168497 A1 | 7/2007 | Locker et al. | ........... | 709/224 |
| 2008/0010299 A1 * | 1/2008 | Ogawa | ........... | 707/10 |
| 2008/0104348 A1 * | 5/2008 | Kabzinski et al. | ........... | 711/164 |
| 2008/0178186 A1 * | 7/2008 | Capek et al. | ........... | 718/103 |
| 2008/0294861 A1 * | 11/2008 | Benhase et al. | ........... | 711/162 |

FOREIGN PATENT DOCUMENTS

| | | |
|---|---|---|
| EP | 0944232 A2 | 9/1999 |
| JP | 2000-353135 | 12/2000 |
| JP | 2005-322033 | 11/2005 |
| JP | 2007-081869 | 3/2007 |
| WO | WO 98/26366 | 6/1998 |
| WO | WO2004/063840 A2 | 7/2004 |
| WO | WO2008/068601 A2 | 6/2008 |

* cited by examiner

*Primary Examiner* — Patrice Winder
*Assistant Examiner* — Ebrahim Golabbakhsh
(74) *Attorney, Agent, or Firm* — Patrick J. Daugherty; Driggs, Hogg, Daugherty & Del Zoppo Co., LPA

(57) ABSTRACT

Apparatus, methods and program products by which the user of a computer system may initiate an interval during which the user leaves the system idle to permit the system to become engaged in peer to peer software distribution.

16 Claims, 6 Drawing Sheets

APPARATUS AND METHOD FOR SELECTIVE ENGAGEMENT IN SOFTWARE DISTRIBUTION

FIELD AND BACKGROUND OF INVENTION

This invention is directed to apparatus, methods and program products by which a computer system normally under use by a usual operator may be selectively engaged in software distribution. More particularly, such as system may be linked into a peer to peer distribution scheme when the user has notified of an interval during which the user leaves the system idle. That is, when the system is user inactive but operationally active.

SUMMARY OF THE INVENTION

It has been proposed before that maintenance tasks for a user's system which require downloading and installation of software such as applications, full images, new virus definitions, security patches and the like be done from dedicated servers strategically located relative to a group of computer users and their workstations. Such systems of software distribution are well known and in wide use. Such systems impose significant burdens, including the cost of dedicated systems to function as servers.

Alternative proposals have been based on peer to peer distribution, where user workstations become part of the distribution network and provide a channel through which downloads are directed to other user systems. Such systems, which used to some extent, encounter resistance from computer system users where operation of the system occasionally requires "highjacking" of user systems when the user would prefer to be engaged in other tasks. Users dislike giving up CPU and hard drive cycles when actively operating their systems.

With the foregoing in mind, it is one purpose of this invention to provide a user of a client system with a way to indicate that a period of non-use has been initiated and engage the user's system in a peer to peer distribution if the system has been enabled by an administrator or other manager. This invention contemplates that such a capability for the user is provided by an "away" button which may be activated by the user to indicate to a network that a period of non-use or user inactivity has been started.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The present invention may be implemented in a computer system, in a method of operating a computer system, and in the form of a program product distributed for use in a computer system.

Figure 1:
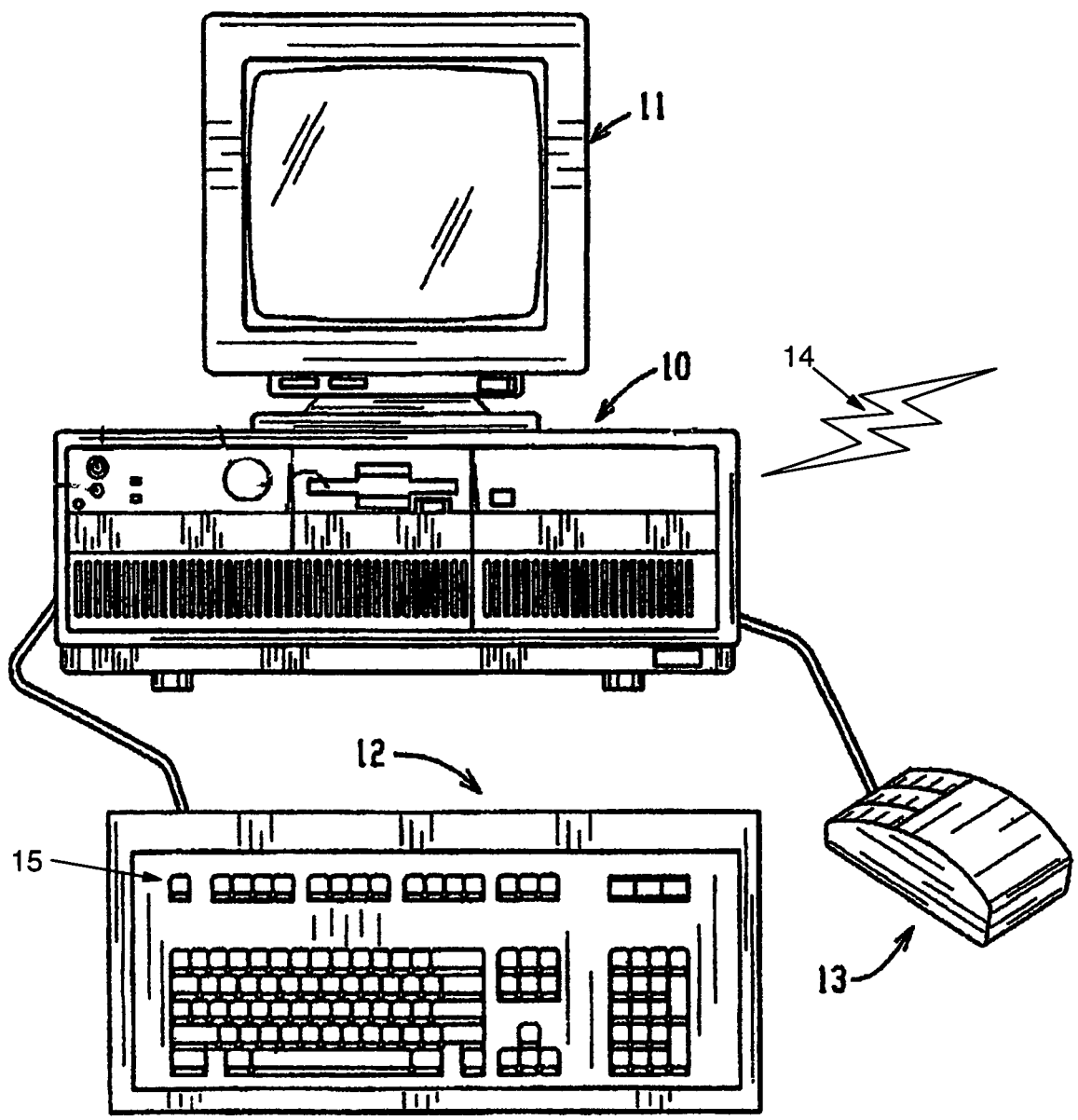
FIG. 1 is an illustration of a deskside computer system in which the present invention is implemented.

Turning first to implementation in a computer system, FIG. 1 illustrates a typical computer workstation, here a personal computer system 10. The system includes a central processor, memory accessible to the processor for storing data including programs to be executed, a display 11, input devices including a keyboard 12 and a pointing device (here shown as a mouse 13), and output devices including a network interface, often known as a NIC. The NIC may implement network connectivity by a wired connection such as an Ethernet connection or by a wireless connection (indicated at 14 in FIG. 1) such as one of the IEEE 802.11 protocols. Such computer systems come in a variety of configurations, some known as notebook systems, others as desktop or deskside systems, some known as servers, and some known as "thin clients". All such systems include some form of data storage device, typically a hard disk drive. Such a drive is typically housed within the system housing and not readily visible to an observer, but known to be present from system operation. The same technology appears in what are known as handheld computer systems (some of which are also known as PDAs or Personal Digital Assistants) and in certain telephone instruments such as cellular or smart telephones. The present invention finds usefulness with any such systems, and it is to be understood that the choice of one type of such system for illustration is in no way limiting upon the implementation of this invention. Persons familiar with the arts of computer technology will easily recognize the scope of applicability of what is here described and illustrated.

In one embodiment of the present invention, the away button is an electro mechanical device taking the form of a key 15 on the system keyboard 12 or a button on the front bezel of the display 11 (not shown in FIG. 1) or front bezel of the system. In such a form, the user may press the away button to signal through the network interface the initiation and termination of an interval of non-use of the system by the user. Such a signal may be received by a system administrator or manager to provide certainty that the client system is inactive and that maintenance, download of software or messages or signaling may be accomplished.

Figure 2:
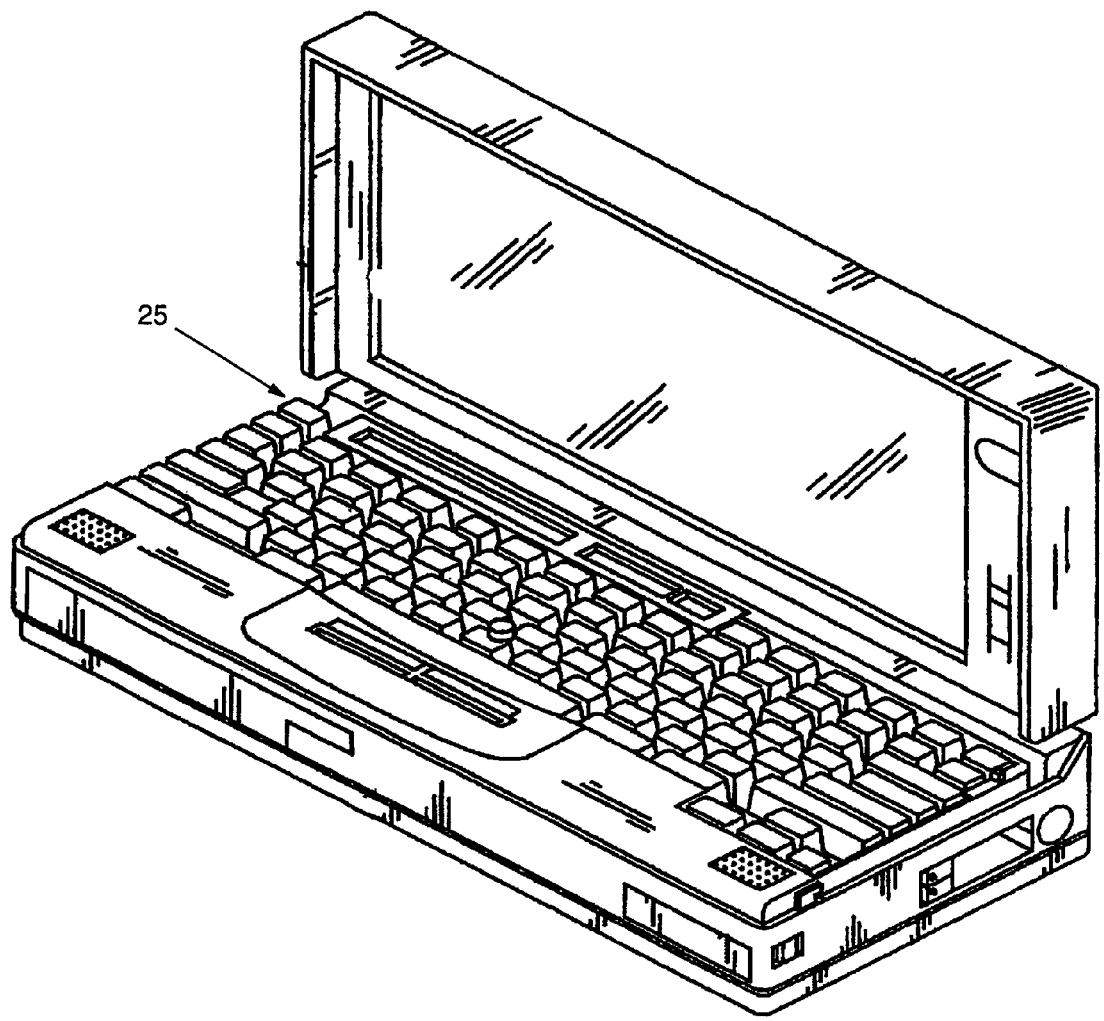
FIG. 2 is an illustration of a notebook computer system in which the present invention is implemented.
Figure 3:
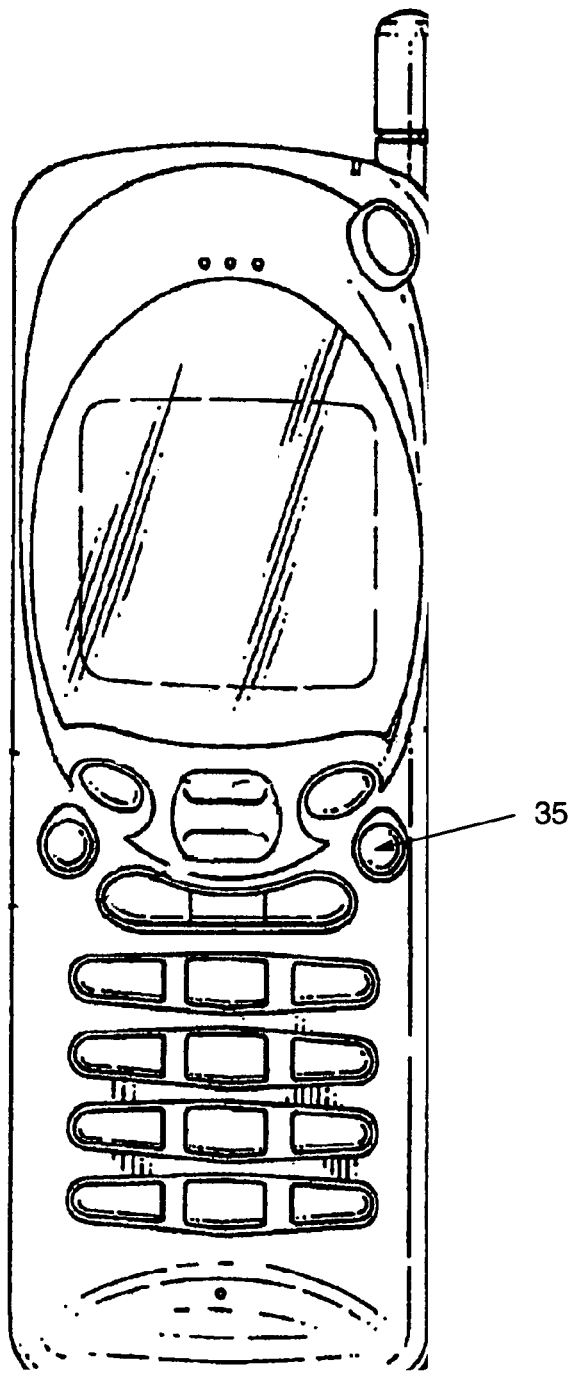
FIG. 3 is an illustration of a handheld computer system in which the present invention is implemented.
Figure 4:
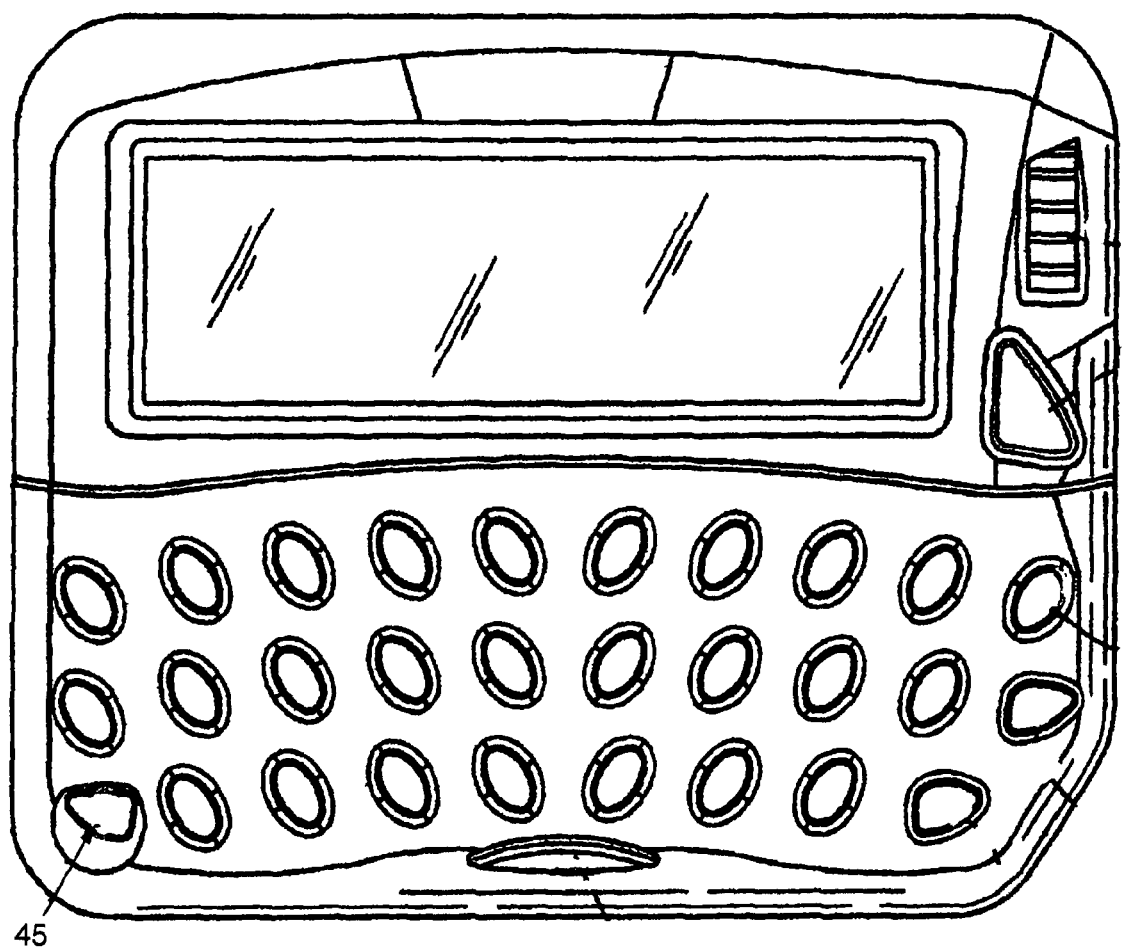
FIG. 4 is an illustration of a telephone instrument in which the present invention is implemented.

FIGS. 2, 3 and 4 illustrate implementations comparable to that described to this point in a notebook system, a handheld system, and a cell phone, respectively. In each view, an away button is shown at 25, 35 and 45, respectively.

Figure 5:
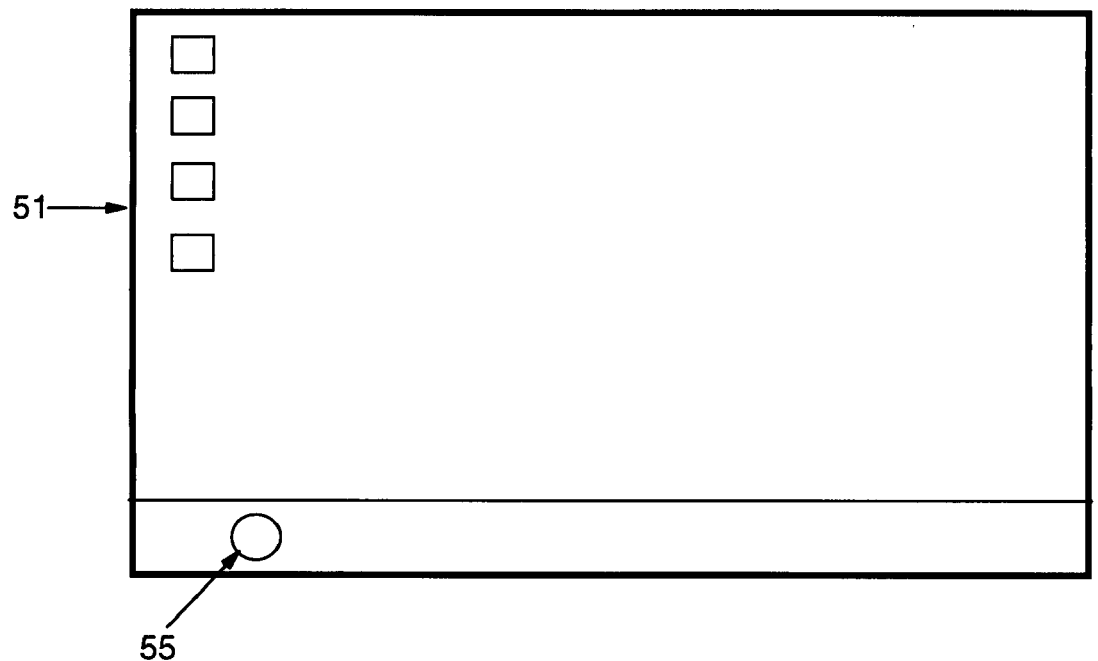
FIG. 5 is an illustration of a display generated by any one of the system of FIGS. 1 through 4 in accordance with an alternate implementation of this invention.

FIG. 5 shows a display such as may be generated by any of the systems of FIGS. 1 through 5. Here, the away button is implemented by software which drives the display of an element 55 displayed visibly to a user on the display 51. The away button may be selectively activated by the user by using a pointing device to move a cursor over the element 55 or, where a touch screen is employed as the display, by touching the button element with a stylus or finger.

In accordance with the present invention, when a system user indicates that the system is going into a state known here as "user inactive" or "non-use" by actuating the away button (in whatever form that may take for the system in use), a program stored in the system activates and registers the system through the NIC with a master distribution server (or MDS) which communicates with the network to which the client system is connected. The MDS provides support to systems administrators or managers for the distribution of software to client systems, such as application updates, virus definition updates, security patches for software installed on the client systems, and the like. On registering, the client system may advise the MDS of any software already stored which may be appropriate and available for distribution in the peer to peer scheme.

Registration with the MDS allows to MDS to become aware that there will be an interval of time during which the client system is not in use by the normal user, yet is still functioning and of any resources already available through the client system. Thus, during that interval of time, the client system will have CPU and hard disk cycles available for other applications. The system NIC remains active during an interval of non-use to receive network communications engaging the system in peer to peer distribution of software. That is, the system, during non-use by the normal user, can be employed by the MDS and the network to assist in and support distribution of software to other client systems on the network. The client system becomes a sub-net representative for software download to other systems.

Desirably, a user indicating an interval of non-use will also indicate the length of time it is anticipated that the system will remain functionally operative and in the state of user non-use. Such an indication will enable the MDS to more accurately assign distribution work to available systems.

During the interval of non-use, the NIC remains active so that the system may receive software to be distributed from the MDS and store received software on a storage device in the client system. The storage device typically will be the system hard drive. The software may be stored in a partition hidden from, and inaccessible to, the normal user. From that storage location, the software may be delivered on the command of the MDS to other client systems on the network. This reception and storing may be of software to be distributed substantially immediately or software which will be retained for later accessibility or both.

On entering the non-use state and signaling to the MDS, the client system will send a packet indicating applications it is capable of distributing, the time interval available for assignment, and the position of the system on the network. The MDS will make entries into a table recording this data. Then, should another system on the network request a download, the MDS will check the table to see if a client system in the state of non-use is capable of making a distribution; make a comparison among available systems if there are a plurality; and assign a pathway for downloading. While downloading is progressing, the MDS will update the table to indicate that the serving client system is busy and send a packet to that system instructing it in providing the download. After the distribution completes, the table is cleared. After the client system user returns and cancels the away indication, the system data is removed from the table.

In the event that no non-use client is available, then the distribution is made form the MDS.

It is contemplated that the MDS may be able to retain a list of locations at which specific software elements are stored in client systems, to shorten the time necessary to make a distribution as here described.

Figure 6:
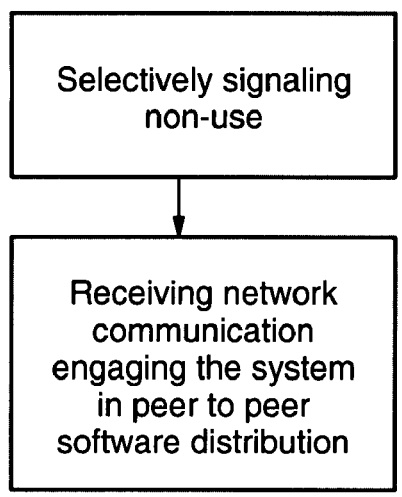
FIG. 6 is a flow chart illustrating the steps in implementation of the invention in the apparatus of FIGS. 1 through 5.

The sequence of operation of any of the various implementations described is illustrated by a flow chart in FIG. 6. There the steps of a method in accordance with this invention are shown. The method steps include selectively signaling from a computer system the initiation and termination of an interval of non-use of the system by a user; and, during the interval of non-use, receiving at the computer system a selectively sent network communication engaging the computer system in peer to peer software distribution. During the interval of non-use, the computer system receives from a master distribution server software to be distributed further to other client systems which request distribution from the master distribution server, stores the software in a data storage device, and responds to direction from the master distribution server to furnish software stored in said storage device to be distributed further to other client systems which request distribution from the master distribution server.

Figure 7:
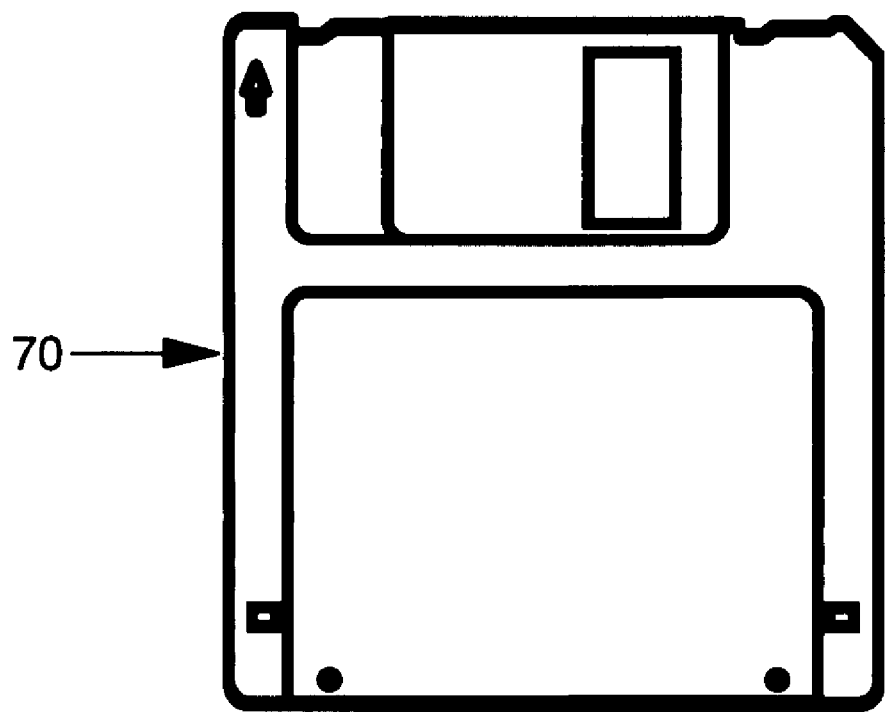
FIG. 7 is an illustration of a computer readable medium bearing program code which, when executing on one of the systems of FIGS. 1 through 4, implements the present invention.

In implementing this invention, it is apparent that computer executable program code is produced and stored on a computer readable medium from which the program code is deployed to and executed on a computer system. Such a medium is shown in FIG. 7 as a diskette 70. The choice of a diskette for illustration is simply that—an illustration—as such media come in a variety of forms including hard drives, flash memory and other devices. As will be clear from the discussion above, the program code comprises instructions which, when executing on the computer system selectively signals from the computer system the initiation and termination of an interval of non-use of the system by a user; and, during the interval of non-use, receives at the computer system a selectively sent network communication engaging the computer system in peer to peer software distribution as here described.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a computer system having a network interface connection, a data storage device operatively coupled to said network interface connection and an away button;
   wherein said away button, in response to selective activation by a user, signals a master distribution server through said network interface connection an initiation and a termination of an interval of non-use of said computer system by the user, and registers said computer system with the master distribution server, wherein the registering of the computer advises the master distribution server of any software already stored on the data storage device which is available for distribution in a peer to peer distribution of software by sending packet data indicating applications it is capable of distributing and a time interval available for assignment; and
   wherein said computer system and said network interface connection remain active and respond to directions from the master distribution server during the signaled interval of non-use of said system by the user to receive network communications engaging said system in a peer to peer distribution of software to receive and store software from the master distribution server on said data storage device and distribute at least one of the already stored software and the received software to another client system through a pathway assigned to said computer system by the master distribution server in response to an instruction packet from the master distribution server.

2. Apparatus according to claim 1 wherein said away button is a hardware component.

3. Apparatus according to claim 1 wherein said system further has a display and said away button is an element displayed visibly to a user on said display.

4. Apparatus according to claim 1 wherein said computer system is a selected one of a class consisting of a notebook computer system; a desktop computer system; a handheld computer system; and a telephone device.

5. Apparatus according to claim 1 wherein said software received from the master distribution server is stored in a partition hidden from and inaccessible to the computer system user.

6. Apparatus according to claim 1, wherein the computer system distributes the at least one of the already stored software and the received software to the another client system on a network in communication with said network interface connection which requests distribution from the master distribution server.

7. Apparatus according to claim 1, wherein the master distribution server makes entries into a table recording the packet data and, in response to another system on the network requesting a download:
   checks the table to see if the computer system is in a state of non-use and is capable of making a distribution; and
   updates the table to indicate that the computer system is busy while downloading is progressing.

8. Apparatus according to claim 7, wherein the master distribution server clears the table after distribution of the software is complete.

9. Apparatus according to claim 7, wherein the master distribution server removes the packet data from the table in response to the user returning and cancelling the away indication through the selective activation of the away button by the user.

10. A method, comprising:
   in a computer system having a network interface connection, a data storage device operatively coupled to said network interface connection and an away button, the away button, in response to selective activation by a user, signaling a master distribution server through the network interface connection an initiation and a termination of an interval of non-use of the computer system by the user and registering the computer system with the master distribution server;
   the registering the computer system with the master distribution server advising the master distribution server of any software already stored on the data storage device which is available for distribution in a peer to peer distribution of software by sending packet data indicating applications the computer system is capable of distributing and a time interval available for assignment;
   the computer system and the network interface connection remaining active and responding to direction from the master distribution server during the signaled interval of non-use of the system by the user; and
   the computer system engaging in a peer to peer distribution of software to receive and store software from the master distribution server on said data storage device and distribute at least one of the already stored software and the received software to another client system through a pathway assigned to said computer system by the master distribution server, in response to an instruction packet from the master distribution server received while remaining active and responding to the direction from the master distribution server during the signaled interval of non-use of the system by the user.

11. The method of claim 10, further comprising:
   making entries into a table recording the packet data;
   requesting a download in response to another system on the network;
   checking the table to see if the computer system is in a state of non-use and is capable of making a distribution; and
   updating the table to indicate that the computer system is busy while downloading is progressing.

12. The method of claim 11, further comprising:
   clearing the table after distribution of the software is complete.

13. The method of claim 12, further comprising:
   removing the packet data from the table in response to the user returning and cancelling the away indication.

14. A method, comprising:
   producing computer executable program code;
   storing the produced program code on a computer readable medium device; and
   providing the medium device and the program code to be deployed to and executed to a computer system having a network interface connection, a data storage device operatively coupled to said network interface connection and an away button;
   the program code comprising instructions which, when executing on the computer system, cause the computer system, in response to a selective activation of the away button by a user, to:
   signal a master distribution server through the network interface connection an initiation and a termination of an interval of non-use of the computer system by the user by sending packet data indicating applications it is capable of distributing in a peer to peer distribution of software and a time interval available for assignment;
   register the computer system with the master distribution server by advising the master distribution server of any software already stored on the data storage device which are available for distribution in the peer to peer distribution of software; and
   remain active and engage in a peer to peer distribution of software to receive and store software from the master distribution server on said data storage device and distribute at least one of the already stored software and the received software to another client system through a pathway assigned to said computer system by the master distribution server, in response to an instruction packet from the master distribution server during the signaled interval of non-use of the system by the user.

15. The method of claim 14, wherein the program code instructions, when executing on the computer system, further cause the computer system to:
   display the away button visibly as an element to a user on a display of the computer system.

16. The method of claim 14, wherein the program code instructions, when executing on the computer system, further cause the computer system to:
   store software received from the master distribution server in a partition hidden from and inaccessible to the computer system user.

* * * * *